Patented July 1, 1941

2,247,453

UNITED STATES PATENT OFFICE 2,247,453

ASBESTOS AND CEMENT COMPOSITION AND METHOD OF MAKING

Thomas Ivan Taylor, Minneapolis, Minn.

No Drawing. Application September 28, 1938, Serial No. 232,231

16 Claims. (Cl. 106—95)

This invention relates to waterproof asbestos and cement compositions and the method of making the same. More particularly, it relates to waterproofing such compositions by means of soaps and an agent added to protect the soap from loss of waterproofing effect on standing in contact with the other ingredients of the asbestos and cement compositions.

There has been need for a long time of a satisfactory and economical method of waterproofing asbestos and cement compositions. Some materials proposed for this purpose evaporate or change color on exposure to the weather. Others, such as the soaps that have been tried widely, give an effect that is satisfactory for a limited period of time only. When such soaps as ammonium stearate, sodium stearate, or aluminum stearate are used, there may be made asbestos and cement units that when new shed water very well. Exposure of the units to sun and rain, however, cause a loss in water-shedding properties until, after a few months or more of such exposure, water applied to the units will sink into them readily.

It is an object of the invention to prevent this loss of effectiveness of the soap-treated units on outdoor exposure. Other objects and advantages of the invention will appear from the detailed description that follows.

For the purpose of illustration, the invention will be described in connection with the making of compressed and highly densified asbestos and cement sheets such as those in common use for shingles or siding units.

Such sheets are made by forming an intimate mixture of Portland cement, asbestos fibers, and water, shaping the mixture into sheet form, and compressing it very strongly, as in a hydraulic press, so as to remove excess of water and consolidate the ingredients. This compressed material is then subjected to treatment to cause hydration or curing of the Portland cement. Thus, the compressed material is allowed to stand at atmospheric temperature for about a month or is subjected to some one of the known treatments to cause quick curing of the cement.

Various admixtures may be present in the asbestos and Portland cement composition as, for example, suitable pigments, fillers, or other ingredients that are common is asbestos and cement sheets.

In making my improved product, I incorporate into the asbestos and cement composition, which contains normally an alkali metal compound such as the sodium or potassium compounds present in the asbestos or Portland cement, an agent to prevent the formation of appreciable concentrations of alkali metal hydroxide. The agent is one adapted to depress the hydroxyl ion concentration of the composition, that is, make the concentration thereof much less than would be the case in the absence of the agent. Thus, I may add an agent which neutralizes such hydroxide as formed in the composition or a buffer which maintains at a low concentration the hydroxyl ion content of the solution.

The agent selected for this purpose should be a water-soluble acidic substance which does not retard substantially the rate of setting of the Portland cement under usual setting (curing) conditions and preferably should be one that gives only freely soluble compounds with the lime liberated during the setting of the Portland cement. Among such materials that may be used to advantage are ammonium chloride, ammonium nitrate, acetic acid, and hydrochloric acid. Various ammonium salts may be used if the acid radical in the salt is at least approximately as strong as acetic acid and does not interfere with the other properties stated above as requirements for the said agent.

Agents which maintain the hydroxyl ion concentration of the composition at a low level include, in addition to the acidic substances of the class described, the buffer salts, as, for example, ammonium acetate, ammonium citrate, or acid salts having the general properties recited above. These buffers prevent the development of excessive hydroxyl ion concentrations, in accordance with the well known action of such buffers in the presence of sodium hydroxide, calcium hydroxide, or the like.

Agents that are sulfates are avoided as they do not give a freely soluble calcium salt.

Among the soaps that may be added for waterproofing effect are those of ammonium or aluminum. For some purposes there may be used sodium or calcium soaps. If the soap contains fixed alkali metal, as, for instance, sodium or potassium, then the said agent referred to above should be added in proportion in excess of the amount chemically equivalent to the fixed alkali metal content of the soap added and, preferably, in amount at least equivalent to the total fixed alkali metal content of the entire composition, including the asbestos fibers, Portland cement, and added soap.

It will be understood that aluminum stearate and calcium stearate have a waterproofing effect when incorporated into asbestos and Portland cement compositions and also that a soap added in soluble form, say as ammonium stearate, palmitate, or oleate, reacts with lime or aluminum compounds in asbestos and Portland cement compositions, to give the corresponding calcium or aluminum soap.

In a typical illustrative procedure, I first form a mixture of Portland cement and asbestos fibers in selected proportion, the exact proportion depending upon the use to which the finished article is to be put. Thus, I form an intimate mixture containing 1 to 3 parts by weight of Portland cement to 1 part of asbestos, the asbestos selected being suitably chrysotile of grade commonly used in the manufacture of asbestos and cement shingles or siding units.

Into this asbestos and Portland cement mixture there is introduced the selected soap and agent for maintaining the hydroxyl ion concentration at low level. Thus, there is introduced the acidic substance or agent, say ammonium chloride in dry form, and then the soap, such as ammonium stearate. The water for mixing and subsequent hydration of the cement may be added at the same time as the ammonium soap, the soap being dissolved therein.

The ingredients may be added to each other in other order. The final mixture is a water-wet asbestos and Portland cement composition including the soap and said agent, or the reaction products thereof.

The mixture is then treated to shape it and remove excess water therefrom, as by filtration on a water permeable support, such as a wire grid with overlying wire or cloth filter, suitably under the influence of suction followed at the end by pressure applied to the material on the filter. This pressure may be increased gradually to that which is usual in the hydraulic pressing of asbestos and Portland cement shingles, say to a pressure of several thousand pounds or more to the square inch.

For some purposes the shaped article may be given a further treatment, to increase the concentration of waterproofing material in the surface portions thereof and/or to increase the whitening effect produced by the treatment with the soap. Thus, an aqueous mixture including an ammonium soap may be sprayed over the face of the article that is to be exposed to the weather or to view during use. I have found it desirable to apply this ammonium soap in a hot solution in water of temperatures between 60° and 100° C. The reaction of the soap with the surface portions of the unit is more rapid and more effective than when the soap is applied at ordinary temperatures.

In any case, the Portland cement in the shaped and compressed article is then cured, that is, hardened or set.

Various proportions of the soap and agent may be used, the proportions selected being determined in part by cost considerations and effectiveness desired in the treatment. I have found good results with proportions of the order of 1 per cent each of ammonium stearate and ammonium chloride on the dry weight of the asbestos and cement composition. For instance, about a half to two per cent of each of these materials may be used.

When waterproofing extending throughout the article is not necessary, the waterproofing may be effected by dipping the article in, spraying with, or otherwise impregnating it with a solution or suspension of the selected soap and agent. Thus compressed asbestos and cement units, cured or uncured, may be sprayed with a hot aqueous solution of an ammonium soap and ammonium chloride or acetate. For example, I have sprayed cured asbestos and cement sheets with a 2 to 3% solution of ammonium acetate or chloride, allowed the sprayed sheets to dry partly, and then sprayed them with a hot solution of ammonium stearate of about 2% concentration.

In order to avoid discoloration on long exposure to the weather, I prefer to use a soap the fatty acid of which consists largely of saturated acids such as stearic and palmitic.

The waterproofing produced, as described herein, is much more lasting on exposure to air and water than the waterproofing obtained in comparable manner except for the omission of the agent serving to neutralize alkali in the asbestos and Portland cement compositions.

Once this surprising result is observed various theories may be advanced to account for it. While the invention is not limited to any theory of explanation, the following observations are of interest.

Most Portland cements contain from 0.2% to 3.0% alkali metal compounds calculated as oxides, of which a substantial proportion, say about one half, forms alkali metal hydroxide when the cement is mixed with water. The remaining alkali metal compounds serve as a potential source of alkali metal hydroxide, since the lime formed in the setting of the asbestos and Portland cement composition reacts in the presence of water with the alkali metal compounds therein to produce small amounts of alkali metal hydroxide or the ions corresponding thereto. On this basis, lime would react with sodium compounds to give an equilibrium proportion of sodium hydroxide and calcium salts of radicals initially combined with the sodium. Thus, at the time of mixing there is present an appreciable concentration of alkali metal hydroxide, and even after setting, if water enters the asbestos and Portland cement composition, there are formed small additional amounts of alkali metal hydroxide.

It was demonstrated experimentally, by shaking aluminum stearate with sodium hydroxide solution and obtaining a lather, that soluble sodium soaps or readily dispersible, partially soluble complex sodium alumino-stearate soaps are formed, whereas aluminum stearate shaken with sodium chloride solution is not affected. It was conceived that the formation of these soluble and readily dispersible soaps at the time of mixing the asbestos and Portland cement with water or by the slow interaction of the insoluble soap with alkali metal hydroxide, during wetting with rain, might be responsible for the slow deterioration of waterproofing properties of the insoluble soaps in asbestos and cement compositions.

If these sodium soaps are formed, they are extractable from the asbestos and Portland cement composition as by rain or repeated immersion in water. I have found this to be the case, as shown by loss of effectiveness of insoluble soaps as waterproofing for asbestos and cement compositions when exposed to water for a long time.

On the basis of this theory the purpose of the said agent described herein, such as ammonium chloride, ammonium acetate or other acidic material of the required properties, is to neutralize alkalinity of the asbestos and cement composition, so that there is not formed a sufficient amount of a fixed alkali metal hydroxide such as the hydroxide of sodium or potassium, to cause conversion of the insoluble waterproofing soap to the soluble or dispersible form. Such agents including an acid radical combined with the ammonium radical are especially satisfactory for the present purpose, because the ammonium radical is not fixed but is lost by volatilization in the form of ammonia, after ammonium chloride or the like reacts with the hydroxide of a metal such as sodium, potassium, or calcium.

The amount of the said agent used should be at least equivalent to the fixed alkali metal present in the added soap, in case a soap of sodium or potassium is the one added to the asbestos and cement composition. Preferably, the amount of the agent used should be at least approximately equivalent to the total fixed alkali metal content present in the asbestos and Portland cement composition in addition to that, if any, in the soap added.

In calculating the chemical equivalence of the said agent and alkali metal compound, one molecular proportion of ammonium chloride or ammonium acetate is equivalent to an amount of the alkali metal compound containing one equivalent weight of sodium or potassium.

In the examples of the invention given above, the Portland cement used contained about 0.3 per cent of fixed alkali metal calculated as sodium oxide. When the proportion of such metal present in the Portland cement is substantially greater or less than this percentage, then the proportion of said agent used may be increased or decreased to correspond with the change in the percentage of the said fixed alkali metal compound. In general, I prefer to use in the process and product of the invention a Portland cement that is relatively low in fixed alkali metal content, as compared to the average of the more important varieties of Portland cement now on the American market.

In a modification of the invention, a portion of the ammonium stearate or other soap added is replaced by a water-insoluble, unsaponifiable, fusible below 100° C., soap-emulsifiable material of pronounced water-repellence. Such a material is a wax, such as paraffin or scale wax. Other materials of the general properties stated may be used.

For instance, I have waterproofed asbestos and cement units, as follows: The units are impregnated with ammonium chloride or other acidic substance, as described above. There is formed an aqueous solution containing about 2 to 4% of ammonium stearate, at a temperature above the melting point of the wax to be used, as, for example, at 60° to 80° C. The wax is then introduced in amount about equal to that of the stearate. Emulsification is effected, as by mechanical agitation.

The resulting emulsion is then impregnated into the asbestos and cement units, say by spraying or immersion, so that the amount of non-volatile material supplied is about 2% or less on the weight of the units. Usually 0.5% to 1.0% is sufficient.

The soluble stearate, being intimately associated with the wax, carries wax with it to the point at which there occurs reaction to form an insoluble soap. In this way, the wax is deposited at the said point, where it is effective in retarding the action of water upon the resulting insoluble soap.

The treatments described above may be applied to asbestos and cement compositions either before or after being strongly compressed or after the compression and before or after being hardened or cured. To effect treatment more or less uniformly throughout the entire composition, the soap and neutralizing agent are best supplied to the composition either before or at the time of the last addition of water, in making the usual wet mixture for shaping into sheet form and subsequently compressing and hardening.

It will be understood that the details given are for the purpose of illustration, not restriction, and that variations within the spirit of the invention are intended to be included in the scope of the appended claims.

What I claim is:

1. The process of waterproofing which comprises reacting an asbestos and Portland cement composition containing lime and an alkali metal compound with a soap and a water-soluble acidic agent adapted to neutralize the hydroxide of the alkali metal and depress the hydroxyl ion content of the said composition, the said agent being added in proportion substantially in excess of the amount chemically equivalent to any fixed alkali metal present in the soap and being adapted to form a freely water-soluble compound with lime present in the composition.

2. The process of waterproofing which comprises forming an intimate uncured and substantially uncompressed water-wet mixture of an asbestos and Portland cement composition containing lime and an alkali metal compound, a soap, and an added water-soluble acidic agent adapted to neutralize alkali metal hydroxide, strongly compressing the said composition, and then causing the Portland cement therein to set, the said agent being added in proportion substantially in excess of the amount chemically equivalent to any fixed alkali metal present in the soap and being adapted to form a substantially neutral composition with alkalinity present in the composition.

3. The process of waterproofing which comprises forming an uncured water-wet asbestos and Portland cement composition containing lime and an alkali metal compound, an ammonium soap, and a water-soluble agent adapted to neutralize alkali metal hydroxide and then allowing the Portland cement to set.

4. The process of waterproofing which comprises forming an uncured water-wet asbestor and Portland cement composition containing lime and an alkali metal compound, an aluminum soap, and a water-soluble agent adapted to neutralize alkali metal hydroxide and then allowing the Portland cement to set.

5. The process of waterproofing which comprises reacting an asbestos and Portland cement composition containing lime and an alkali metal compound with a soap, water, and an ammonium salt of an acid approximately as strong at least as acetic acid, the said salt being adapted to neutralize the hydroxide of the alkali metal, being substantially non-retarding in its effect upon the setting of the Portland cement and being added in proportion substantially equal at least to the amount chemically equivalent to any fixed alkali metal present in the soap and the said composition.

6. The process of waterproofing which comprises reacting an uncured asbestos and Portland cement composition containing lime and an alkali metal compound with a soap, water, and a water-soluble agent adapted to neutralize alkali metal hydroxide, the said agent being an acidic substance adapted to form freely water-soluble compounds with lime liberated during the setting of the Portland cement and being added in proportion substantially equal at least to the amount chemically equivalent to any fixed alkali metal present in the soap and the said composition.

7. The process of waterproofing which comprises treating an intimate mixture of an asbestos and Portland cement composition containing lime and an alkali metal compound with an ammonium soap and ammonium chloride in the presence of water, the lime and said compound reacting normally to give alkali metal hydroxide and the ammonium chloride serving to neutralize the alkali metal hydroxide.

8. The process of waterproofing which comprises forming an asbestos and Portland cement composition and impregnating thereinto a hot aqueous solution of ammonium stearate.

9. The process of waterproofing which comprises forming an asbestos and Portland cement composition and impregnating thereinto an aqueous solution of ammonium stearate and a water-soluble buffer agent adapted to depress the hydroxyl ion concentration of the said composition.

10. A waterproof composition comprising the products of reaction of an uncured water-wet asbestos and Portland cement composition containing an alkali metal compound, a soap, and a water-soluble acidic agent adapted to neutralize alkali metal hydroxide, the said agent being in proportion substantially in excess of the amount chemically equivalent to any fixed alkali metal present in the soap.

11. A waterproof composition comprising the products of reaction of an asbestos and Portland cement composition containing an alkali metal compound, an ammonium soap, and an added water-soluble agent adapted to depress the hydroxyl ion content of the said composition.

12. A waterproof composition comprising the products of reaction of a water-wet asbestos and Portland cement composition containing an alkali metal compound, an ammonium soap, and a buffer salt adapted to depress the hydroxyl ion content of the said composition, the buffer salt being substantially non-retarding in its effect on the setting of the Portland cement.

13. A waterproof composition comprising the products of reaction of an asbestos and Portland cement composition containing lime and alkali metal compound, an ammonium soap, and ammonium chloride, the lime and said compound reacting normally to give alkali metal hydroxide and the ammonium chloride serving to neutralize the alkali metal hydroxide.

14. A waterproof composition comprising the products of reaction of an asbestos and Portland cement composition containing lime and an alkali metal compound, an ammonium soap, and ammonium acetate, the ammonium acetate serving to neutralize the alkali metal hydroxide normally developed by reaction of lime with the alkali metal compound.

15. A waterproof composition comprising the products of reaction of a water-wet asbestos and Portland cement composition containing lime and alkali metal compound, an ammonium soap, and ammonium chloride, the proportion of the said soap and chloride being each of the order of one part by weight to 100 parts of the said composition, the lime and said compound reacting normally to give alkali metal hydroxide and the ammonium chloride serving to neutralize the alkali metal hydroxide.

16. The process of making a waterproof article which comprises forming a shaped, wet mixture including asbestos fibres, Portland cement, an acidic agent adapted to neutralize alkali metal hydroxide, and an emulsion of a water-repellent wax-like material in an aqueous solution of ammonium stearate, compressing the shaped mixture, and hardening the cement therein.

THOMAS IVAN TAYLOR.